(12) United States Patent
Kim et al.

(10) Patent No.: US 11,858,445 B2
(45) Date of Patent: Jan. 2, 2024

(54) APPARATUS FOR CONNECTING STEERING WHEEL AND AIRBAG MODULE

(71) Applicant: HYUNDAI MOBIS CO., LTD., Seoul (KR)

(72) Inventors: Do Hyoung Kim, Yongin-si (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/361,359

(22) Filed: Jun. 29, 2021

(65) Prior Publication Data

US 2022/0017035 A1 Jan. 20, 2022

(30) Foreign Application Priority Data

Jul. 17, 2020 (KR) .......................... 10-2020-0088757

(51) Int. Cl.
*B60R 21/203* (2006.01)

(52) U.S. Cl.
CPC .............................. *B60R 21/2037* (2013.01)

(58) Field of Classification Search
CPC .............. B60R 21/203; B60R 21/2035; B60R 21/2037
See application file for complete search history.

(56) References Cited

U.S. PATENT DOCUMENTS

| | | | | |
|---|---|---|---|---|
| 7,185,915 B2* | 3/2007 | Fujita | .................. | B60R 21/2037 280/731 |
| 9,855,909 B2* | 1/2018 | Ko | ........................ | B60R 21/203 |
| 9,884,603 B2* | 2/2018 | Kim | .................... | B60R 21/2037 |
| 2001/0054810 A1* | 12/2001 | Sakane | ............... | B60R 21/2037 280/728.2 |
| 2004/0017068 A1* | 1/2004 | Weis | .................... | B60R 21/2037 280/731 |
| 2004/0075249 A1* | 4/2004 | Keutz | ................. | B60R 21/2037 280/727 |
| 2009/0315304 A1* | 12/2009 | Hagelgans | .......... | B60R 21/2035 280/728.2 |
| 2017/0015267 A1* | 1/2017 | Ko | ........................ | B60R 21/2035 |
| 2019/0275976 A1* | 9/2019 | Ko | ........................ | B60R 21/203 |
| 2020/0324726 A1* | 10/2020 | Ko | ........................ | B60R 21/2037 |

FOREIGN PATENT DOCUMENTS

KR 10-1998-0042017 8/1998

OTHER PUBLICATIONS

English Language Abstract of KR 10-1998-0042017 published Aug. 17, 1998.

* cited by examiner

*Primary Examiner* — Barry Gooden, Jr.
(74) *Attorney, Agent, or Firm* — DLA PIPER LLP (US)

(57) ABSTRACT

Proposed is an apparatus for connecting a steering wheel and an airbag module. The airbag module is mounted on a front portion of the steering wheel. A coupling hole extends through the steering wheel in a front-rear direction. A hook extends from the airbag module through the coupling hole to protrude from a rear surface of the steering wheel. A bend on a distal end of the hook is bent in a direction intersecting a longitudinal direction of the hook. A fixing clip blocks the movement of the hook in a forward direction of the steering wheel, with first end being fixed to the steering wheel, and the second end being caught by the bend of the hook. A fixing recess is indented into the steering wheel, thereby allowing the second end of the fixing clip to move in the forward direction of the steering wheel.

9 Claims, 7 Drawing Sheets

APPARATUS FOR CONNECTING STEERING WHEEL AND AIRBAG MODULE

CROSS REFERENCE TO RELATED APPLICATION

The present application claims priority to Korean Patent Application No. 10-2020-0088757, filed Jul. 17, 2020, the entire contents of which is incorporated herein for all purposes by this reference.

BACKGROUND OF THE INVENTION

Field of the Invention

The present invention generally relates to an apparatus for connecting a steering wheel and an airbag module.

Description of the Related Art

An airbag module is a part of a vehicle occupant control system. For example, the airbag module may be disposed within a steering wheel to improve driver protection. In addition, the steering wheel may be used to generate a horn signal.

At present, the airbag module and the steering wheel are fastened to each other by locking connection in order to facilitate the operation of connecting the airbag module and the steering wheel without using a complicated screw connector.

However, there has been a problem that, when an airbag cushion of the airbag module is deployed, the locking connection between the steering wheel and the airbag module may be disconnected by the deployment pressure of the airbag cushion.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to prevent an airbag module connected to a steering wheel from being disconnected from the steering wheel by the deployment force of the airbag cushion.

In order to achieve the above objective, according to one aspect of the present invention, there is provided an connecting apparatus for connecting a steering wheel and an airbag module. The connecting apparatus may include: a coupling hole extending through a steering wheel in a front-rear direction; a hook extending from an airbag module through the coupling hole to protrude from a rear surface of the steering wheel, with a bend being provided on a distal end of the hook to be bent in a direction intersecting a longitudinal direction of the hook; a fixing clip configured to block movement of the hook in a forward direction of the steering wheel, with a first end of the fixing clip being fixed to the steering wheel, and a second end of the fixing clip being caught by the bend of the hook; and a fixing recess indented into the steering wheel, thereby allowing the second end of the fixing clip to move in the forward direction of the steering wheel, whereby the airbag module is mounted on a front portion of the steering wheel.

A middle portion of the fixing clip may be curved or wound such that the first end and the second end of the fixing clip are spread in opposite directions by elasticity.

The middle portion of the fixing clip may include a coiled torsion spring to increase the elasticity by which the first and the second end of the fixing clip are spread.

The steering wheel may include a horn plate on which the airbag module is mounted, the fixing recess may be provided in the horn plate, and the fixing clip is coupled to the horn plate.

The connecting apparatus may further include a clip holder provided integrally with the horn plate and located adjacent to the coupling hole, wherein the fixing clip is coupled to the clip holder.

The fixing clip may be bent in a direction intersecting a direction in which the first end of the fixing clip extends, and the clip holder has an insertion recess indented such that the first end of the fixing clip is inserted thereinto.

The clip holder may include a limit recess into which the second end of the fixing clip is inserted.

The fixing clip may include a hook catch on the second end, the hook catch being wound on a wire of the second end of the fixing clip and being configured to correspond to a portion configured to be in contact with the hook.

The horn plate may include a support rib extending in a direction of extension of the hook and configured to be in contact with an outer surface of the hook.

The coupling hole may be configured such that a cross-sectional area of the coupling hole gradually decreases in a direction of extension of the hook.

In the apparatus for connecting a steering wheel and an airbag module according to the present invention, when the fixing clip inserted into the fixing recess of the horn plate is coupled to the hook, the decoupling of the hook from the fixing clip by the deployment pressure of the airbag may be prevented.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
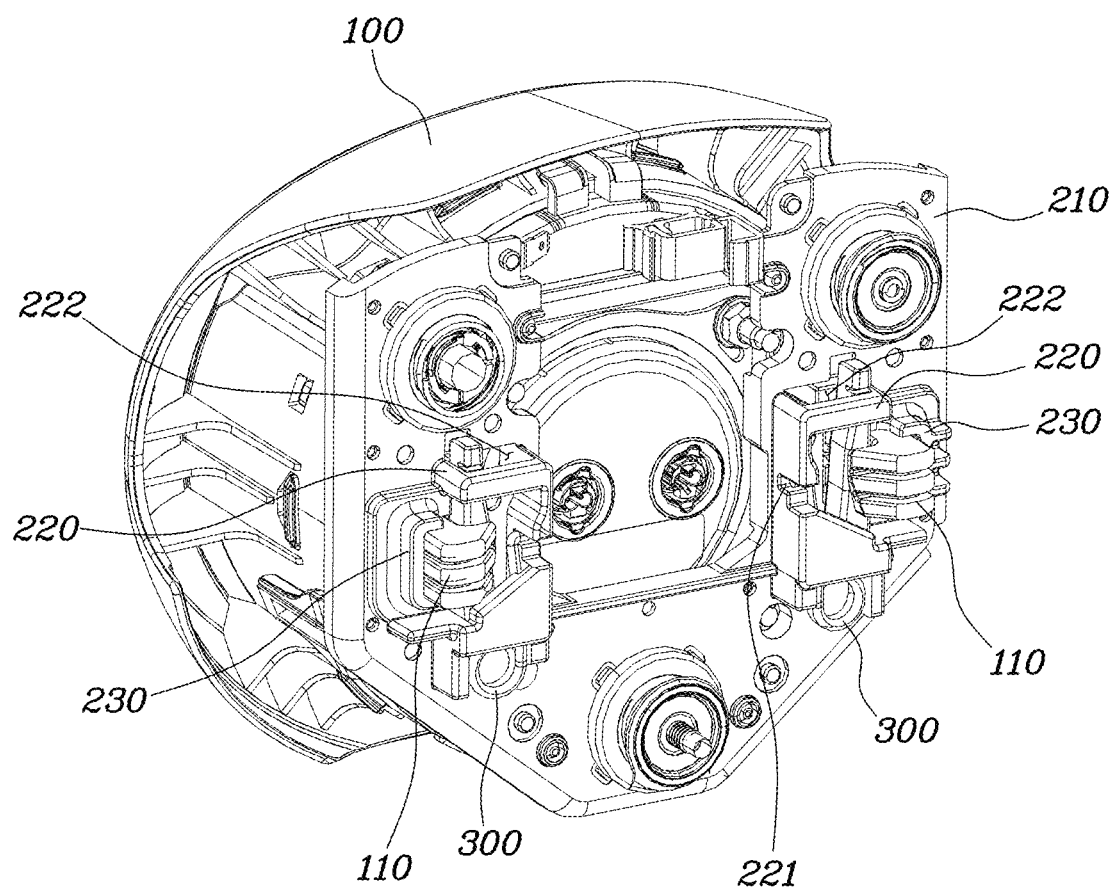
FIG. 1 is a perspective view illustrating an assembly of a steering wheel and an airbag module in an apparatus for connecting a steering wheel and an airbag module according to embodiments of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention.

It will be understood that, although the terms "first", "second", etc., may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

Figure 2:
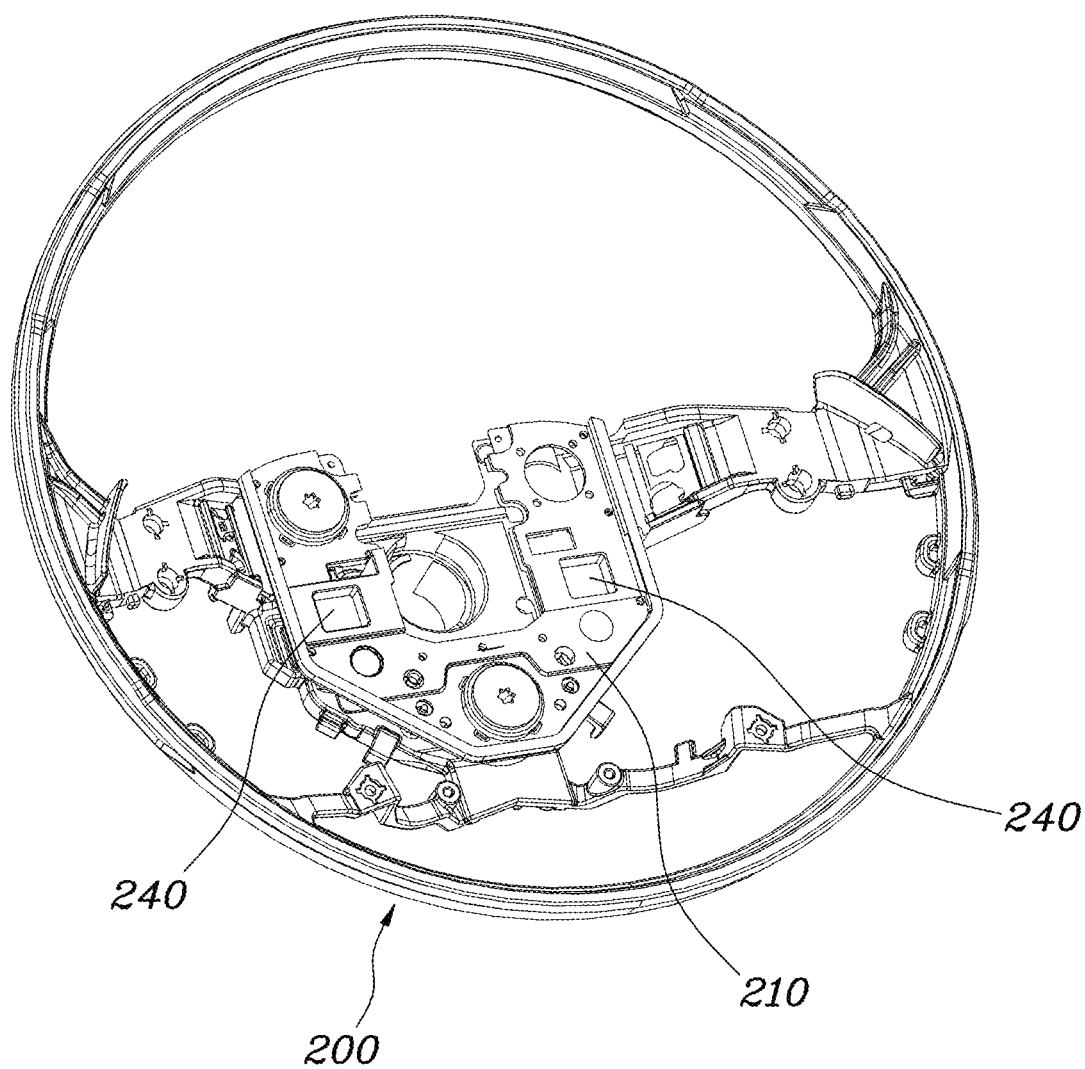
FIG. 2 is a perspective view illustrating the steering wheel in the apparatus for connecting a steering wheel and an airbag module according to embodiments of the present invention.
Figure 3:
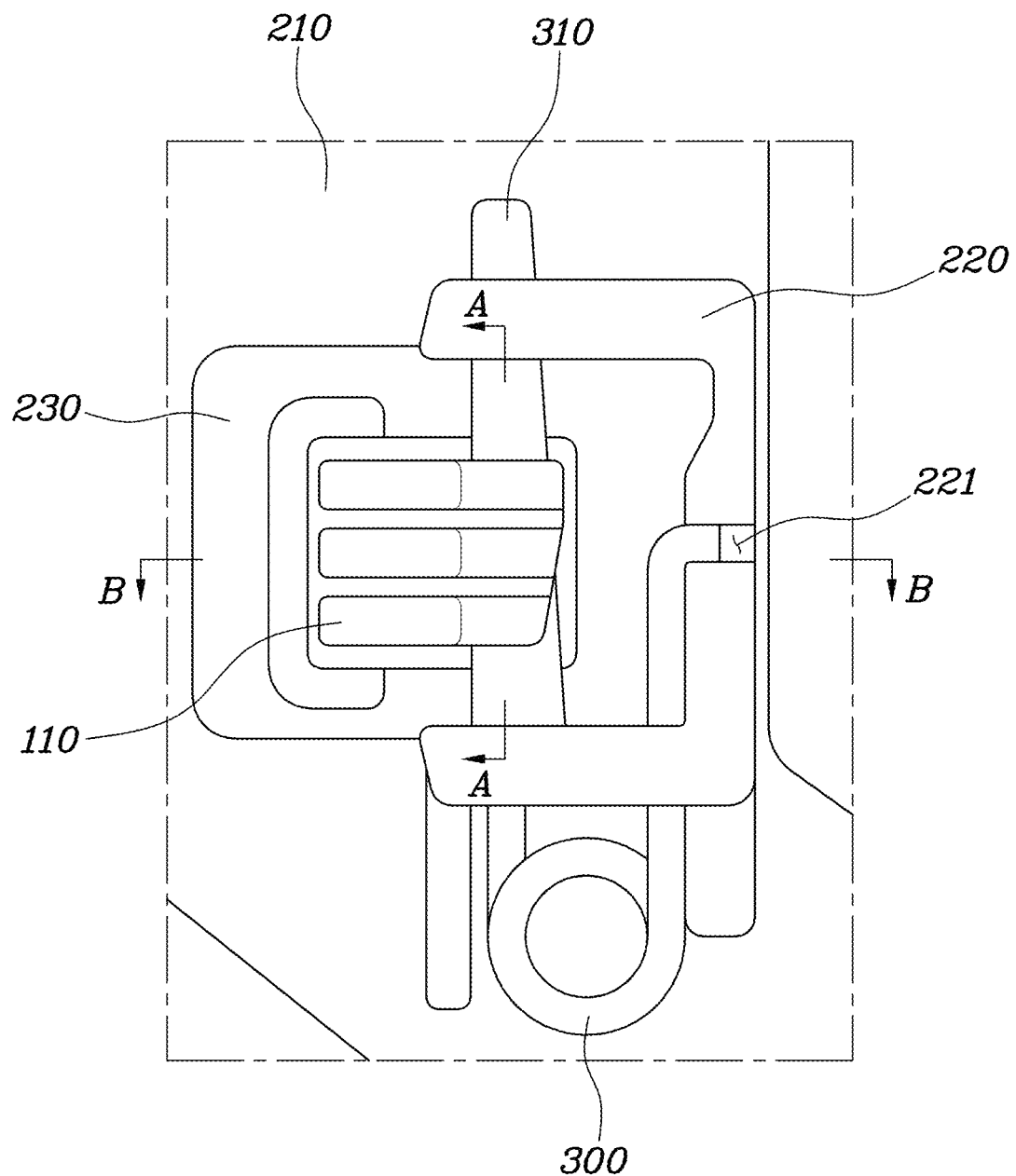
FIG. 3 is a front view illustrating the apparatus for connecting a steering wheel and an airbag module according to embodiments of the present invention.
Figure 4:
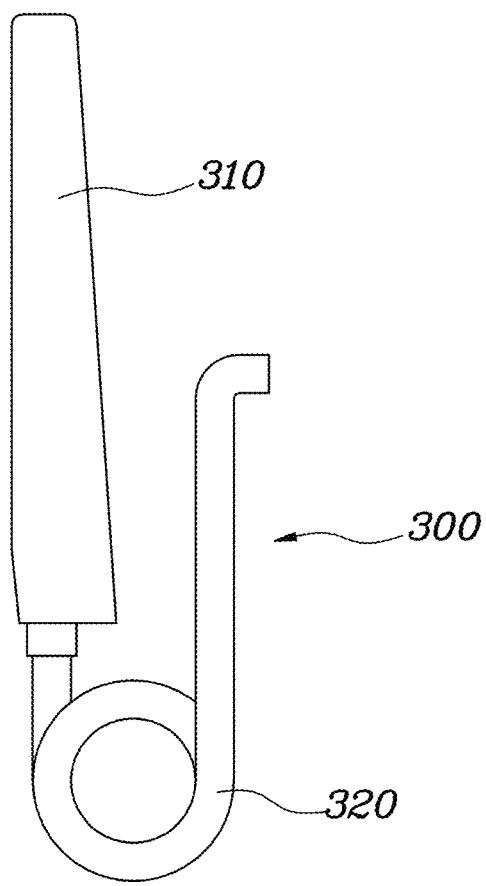
FIG. 4 is a front view illustrating the fixing clips of the apparatus for connecting a steering wheel and an airbag module according to embodiments of the present invention.
Figure 5:
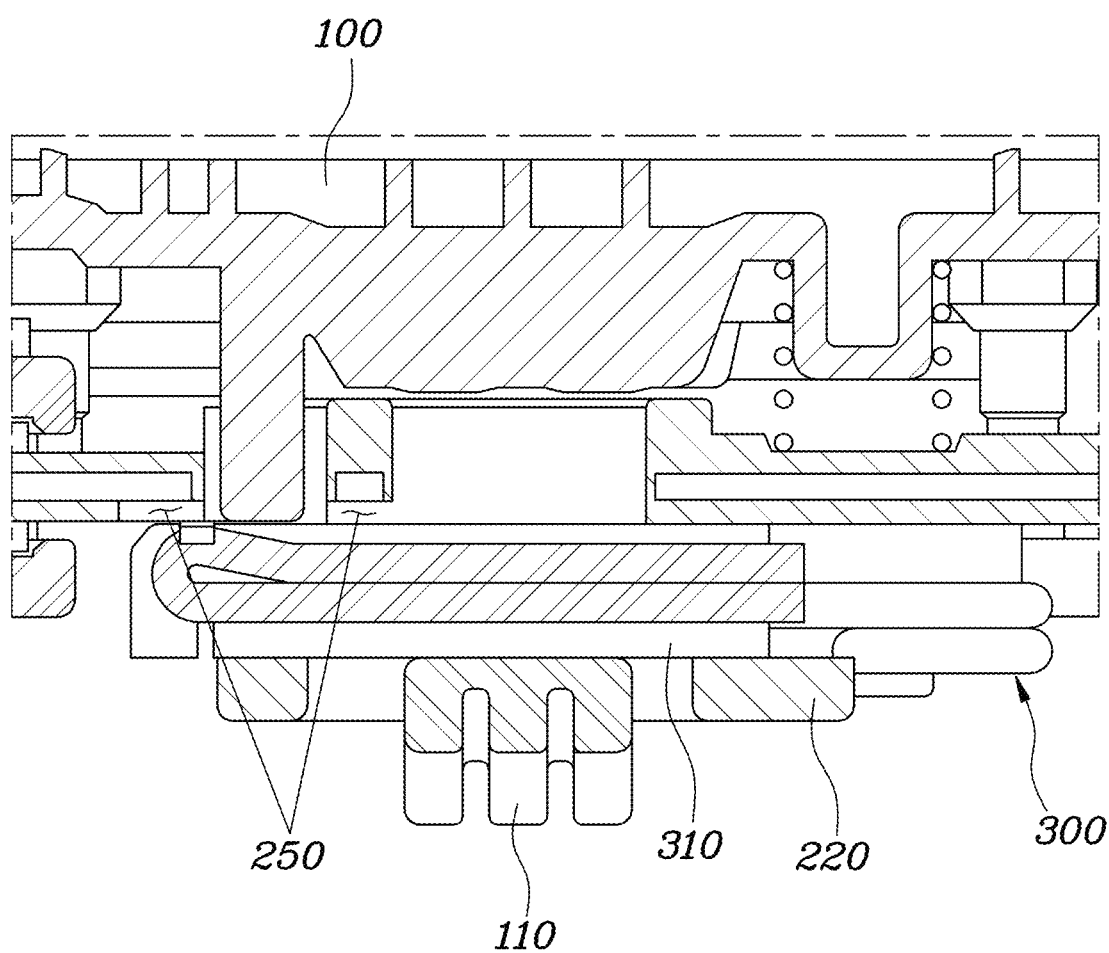
FIG. 5 is a cross-sectional view taken along the line A-A in FIG. 3.
Figure 6:
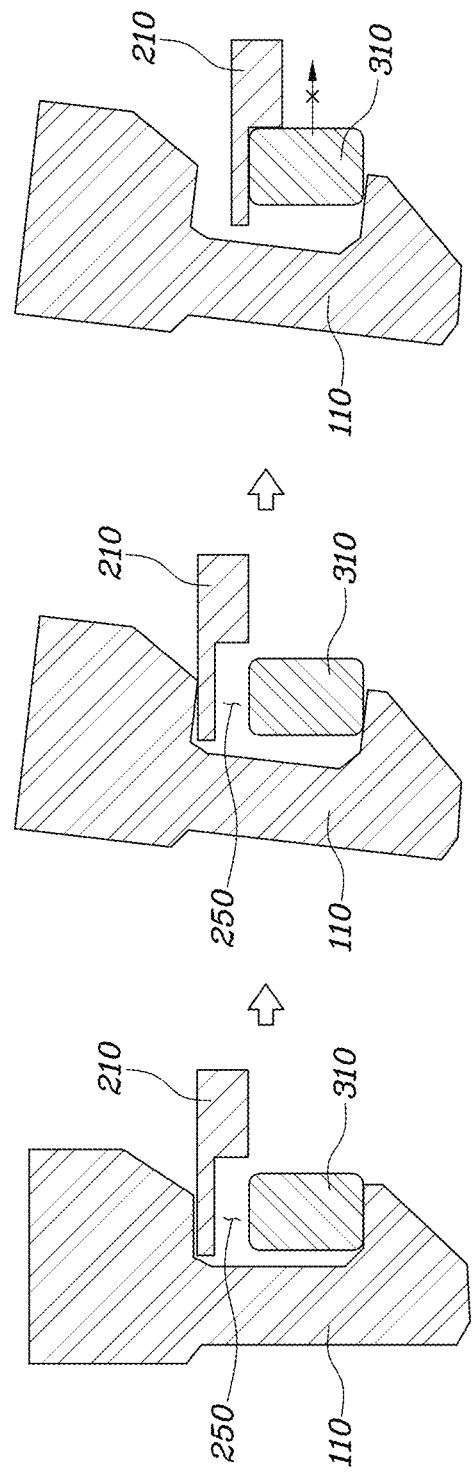
FIG. 6 is a cross-sectional view taken along the line B-B in FIG. 3.
Figure 7:
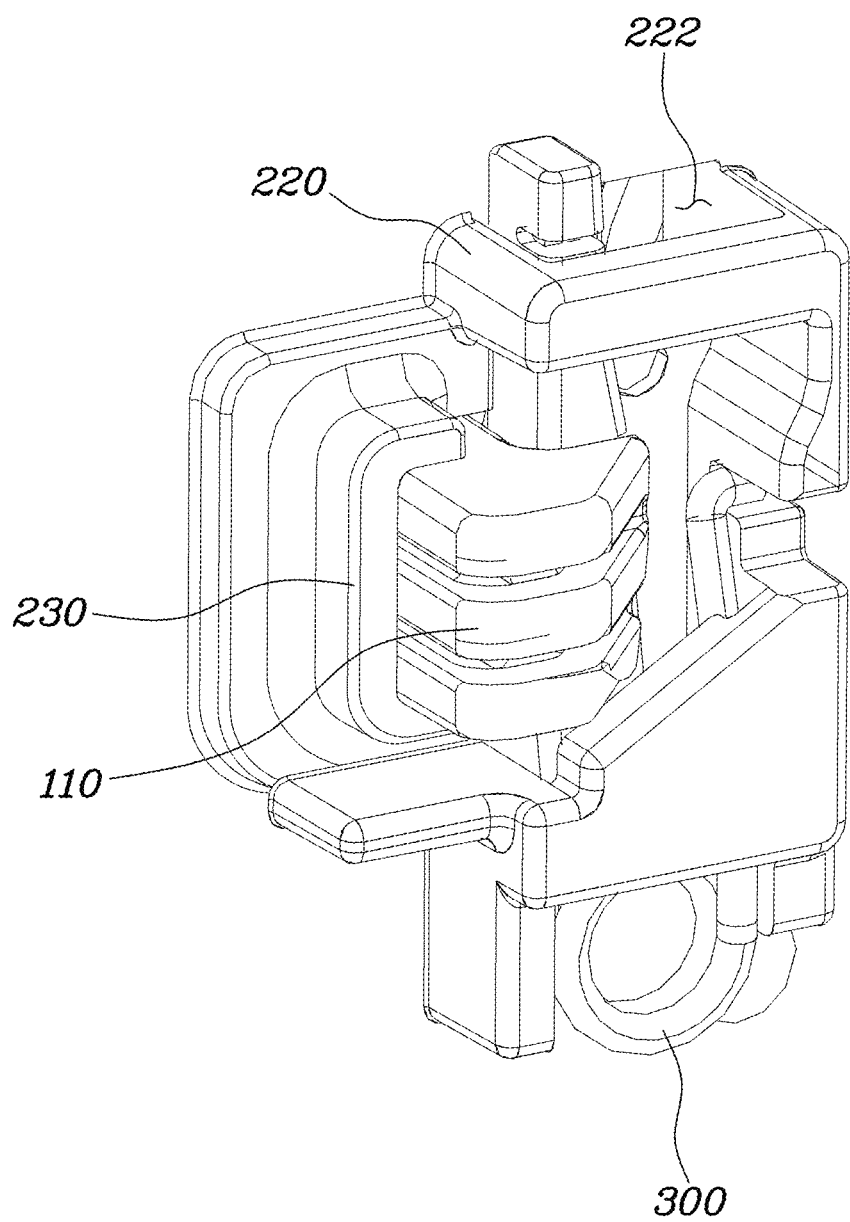
FIG. 7 is a perspective view illustrating the apparatus for connecting a steering wheel and an airbag module according to embodiments of the present invention.

FIG. 1 is a perspective view illustrating an assembly of a steering wheel 200 and an airbag module 100 in an apparatus for connecting the steering wheel 200 and the airbag module 100 according to embodiments of the present invention, FIG. 2 is a perspective view illustrating the steering wheel 200 in the apparatus for connecting the steering wheel 200 and the airbag module 100 according to embodiments of the present invention, FIG. 3 is a front view illustrating the apparatus for connecting the steering wheel 200 and the airbag module 100 according to embodiments of the present invention, FIG. 4 is a front view illustrating fixing clips 300 of the apparatus for connecting the steering wheel 200 and the airbag module 100 according to embodiments of the present invention, FIG. 5 is a cross-sectional view taken along the line A-A in FIG. 3, FIG. 6 is a cross-sectional view taken along the line B-B in FIG. 3, and FIG. 7 is a perspective view illustrating the apparatus for connecting the steering wheel 200 and the airbag module 100 according to embodiments of the present invention.

Hereinafter, exemplary embodiments of the apparatus for connecting the steering wheel 200 and the airbag module 100 according to the present invention will be described with reference to accompanying FIGS. 1 to 6.

The airbag module 100 is mounted on the steering wheel 200 of a vehicle. The airbag module 100 may be deployed toward a driver to protect the driver in a car collision accident.

The airbag module 100 includes an airbag cushion and an inflator. In a car collision accident, when a signal is transmitted from a collision sensor to the inflator, the inflator may inject gas into the airbag cushion, thereby deploying the airbag cushion.

At this time, the airbag module 100 may be disconnected from the steering wheel 200 by the deployment pressure of the airbag cushion, and the present invention was conceived in order to prevent this problem.

The apparatus for connecting the steering wheel 200 and the airbag module 100 according to the present invention is a connecting apparatus by which the airbag module 100 is mounted on the front portion of the steering wheel 200. The connecting apparatus includes: coupling holes 240 extending through the steering wheel 200 in the front-rear direction; hooks 110 extending from the airbag module 100 through the coupling holes 240 to protrude from the rear surface of the steering wheel 200 and respectively having a bend on a distal end thereof, the bend being bent in a direction intersecting the longitudinal direction of the hook 110; the fixing clips 300 configured to block the movement of the hooks 110 in the forward direction of the steering wheel 200, with first end of each of the fixing clips 300 being fixed to the steering wheel 200, and the second end of each of the fixing clips 300 being caught by the bend of a corresponding one of the hooks 110; and fixing recesses 250 respectively indented into the steering wheel 200, thereby allowing the second end of a corresponding one of the fixing clips 300 to move in the forward direction of the steering wheel 200.

As illustrated in FIGS. 1 to 6, the steering wheel 200 has a plurality of coupling holes 240 extending therethrough, thereby allowing the airbag module 100 to be connected to the steering wheel 200 therethrough. The airbag module 100 includes the hooks 110 extending in the direction of the steering wheel 200 from positions corresponding to the coupling holes 240 so as to be coupled to the steering wheel 200.

Each of the hooks 110 has the bend formed by bending the distal end thereof in the direction intersecting the longitudinal direction to be fixed after being inserted into the corresponding coupling hole 240. The bend may be caught by a rear surface portion of the steering wheel 200 to support the airbag module 100 such that the airbag module 100 is not disconnected from the steering wheel 200.

The fixing clips 300 may be disposed on the rear surface of the steering wheel 200 in positions corresponding to the coupling holes 240, with first end of each of the fixing clips 300 being disposed on the steering wheel 200, and the second end of each of the fixing clips 300 being coupled to the bend of the corresponding hook 110, thereby preventing the hook 110 from being released from the coupling hole 240.

When the airbag is deployed, the deployment pressure of the airbag applies force to the hooks 110 in the direction in which the airbag is deployed, so that the fixing clips 300 may be released from the bends of the hooks 110. To prevent this, the steering wheel 200 may be provided with the inwardly-indented fixing recesses 250, and portions of the second ends of the fixing clips 300 may be inserted into the fixing recesses 250, thereby preventing the second ends from being released from the bends, respectively.

In addition, as illustrated in FIG. 6, at an early stage of the mounting on the hooks 110, the second ends of the fixing clips 300 may be caught by the hooks 110 to fix the hooks 110, instead of being inserted into the fixing recesses 250. When the airbag cushion of the airbag module is deployed, the hooks 110 are moved toward the airbag module by the deployment pressure. As the second ends of the fixing clips 300 are inserted into the fixing recesses 250, the second ends of the fixing clips 300 are fixed so as not to move toward the first end side.

Consequently, it is possible to prevent the fixing clips 300 from being released from the hooks 110, thereby preventing the hooks 110 from being released from the coupling holes 240.

Each of the fixing clips 300 is configured such that the middle portion is curved or wound such that first end and the second end are spread in opposite directions by elasticity.

Each of the fixing clips 300 is implemented as a U-shaped wire, with the middle portion being curved or wound, such that first end and the second end are forced in opposite directions. Consequently, the hooks 110 may be fixed in a position in which the hooks 110 are inserted into the coupling holes 240.

In addition, when the hooks 110 are inserted into the coupling holes 240, an operator may move the second end of each of the fixing clips 300 toward first end of the fixing clip 300. When the insertion of the hooks 110 is completed, the elastic force of the second ends of the fixing clips 300 may cause the second ends of the fixing clips 300 to move toward the bends of the hooks 110, thereby improving the convenience of the assembly operation.

The middle portion of each of the fixing clips 300 is implemented as a torsion spring 320. The torsion spring 320 is configured to increase the elastic force of spreading first end and the second end of the fixing clip 300.

In order to increase the elastic force between first end and the second ends of each of the fixing clips 300, the torsion spring 320 may be provided on the middle portion of each of the fixing clips 300, thereby increasing elastic force by which the fixing clips 300 fix the hooks 110.

The steering wheel 200 includes a horn plate 210 on which the airbag module 100 is mounted, the fixing recesses 250 are provided on the horn plate 210, and the fixing clips 300 are coupled to the horn plate 210.

A bracket is required to couple the airbag module 100 to the steering wheel 200. The horn plate may be coupled to the central portion of the steering wheel 200 to realize the function of the bracket, and the airbag module 100 may be coupled to the horn plate 210.

The coupling holes 240 may be provided on the horn plate 210 to couple the airbag module 100 to the horn plate 210, the horn plate and the steering wheel 200 may be coupled to each other, and the horn plate 210 may have space portions in the rear surface, such that the hooks 110 may be inserted into and fixed to the space portions.

In addition, each of the fixing recesses 250, into which a portion of the second end of the corresponding fixing clip 300 is inserted to prevent the second end of the fixing clip 300 from being detached by the deployment pressure of the airbag, may be indented at a position of the rear surface of the horn plate 210 adjacent to the coupling hole 240 in the direction of the airbag module 100.

The connecting apparatus further includes clip holders 220 provided integrally with the horn plate 210. The clip holders 220 may be located adjacently to the coupling holes 240, and the fixing clips 300 may be coupled to the coupling holes 240.

The clip holders 220 may be provided adjacent to the coupling holes 240 to hold the fixing clips 300 to the horn plate 210.

Each of the clip holders 220 may hold the upper and lower portions of the corresponding clip 300, thereby preventing the clip from bouncing backward when the airbag is deployed.

Consequently, the clips may strengthen the coupling of the hooks 110.

First end of each of the fixing clips 300 is bent in a direction intersecting the direction in which the fixing clip 300 extends. Each of the clip holders 220 has an insertion recess 221 indented such that first end of the corresponding fixing clip 300 is inserted thereinto.

First end of each of the fixing clips 300 may be bent toward the center of the steering wheel 200 to intersect the longitudinal direction, and the bent portion may be indented into the insertion recess 221 indented into the clip holder 220.

According to another embodiment, an insertion hole may be provided in place of the insertion recess 221 at a position adjacent to each of the coupling holes 240 of the horn plate 210. First end of each of the fixing clips 300 may be bent in the direction of the airbag module 100 to be inserted into the corresponding insertion hole.

In this manner, the fixing clips 300 may be coupled to the horn plate 210, and a module including the horn plate 210 and the fixing clips 300 may be coupled to the steering wheel 200.

Each of the clip holders 220 further includes a limit recess 222 into which the second end of the corresponding fixing clip 300 is inserted. The limit recess 222 is configured to limit the distance between first end and the second end of the corresponding fixing clip 300.

When the hook 110 is inserted into the coupling hole 240, the second end of the fixing clip 300 may be caused to move toward first end and to return to the initial position by the elastic force. Here, the limit recess 222 formed in the clip holder 220 to limit a position to which the second end of the fixing clip 300 is to move may prevent the fixing clip 300 from being released from the clip holder 220 by an excessive amount of force applied to the fixing clip 300 and prevent the second end of the fixing clip 300 from bouncing by the elastic force when the second end of the fixing clip 300 moves to the original position.

Each of the fixing clips 300 includes a hook catch 310 on the second end. The hook catch 310 is wound on the wire of the second end of the fixing clip 300, and is configured to correspond to a portion configured to be in contact with the hook 110.

As illustrated in FIG. 4, the hook catch 310 may be made from a material, such as resin, wound on the second end of the fixing clip 300, i.e., two folds of the wire made from steel.

When the hook 110 is inserted, the hook catch 310 may be moved toward first end of the fixing clip 300. In this case, the hook catch 310 may extend in the longitudinal direction of the fixing clip 300 to be wound on the second end of the fixing clip 300 in order to improve the convenience of the operator. The outer surface of the hook catch 310 may be configured to correspond to the bent inner surface of the hook 110.

Consequently, there is an effect that, when the hook catch 310 is coupled to the hook 110, the hook catch 310 may be prevented from being easily released from the hook 110.

The horn plate 210 includes a support rib 230 extending in the direction of extension of the hook 110 to be in contact with the outer surface of the hook 110.

The support rib 230 is located on the rear surface of the horn plate, adjacently to the coupling hole 240, and extends in the direction of extension of the hook 110 to be in contact with a portion of the outer surface of the hook 110 that is not in contact with the fixing clip 300 when the hook 110 is inserted into the coupling hole 240.

Consequently, there is an effect that the hook 110 may be prevented from being rotated in the opposite direction to the fixing clip 300 by the deployment pressure of the airbag or external impact.

Each of the coupling holes 240 is configured such the cross-sectional area of the coupling hole 240 gradually decreases in the direction of extension of the corresponding hook 110.

As illustrated in FIGS. 1 and 3, the coupling hole 240 formed in the horn plate 210 is configured such that the cross-sectional area of the coupling hole 240 gradually decreases in the direction in which the hook 110 is inserted. According to the present invention, a portion of the inner surface of the coupling hole 240 is inclined.

Consequently, the hooks 110 may be guided to be easily inserted into the coupling holes 240, and after the hooks 110 are coupled to the coupling holes 240, the hooks 110 may be prevented from being easily decoupled from the coupling holes 240.

Although the exemplary embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. A connecting apparatus for connecting a steering wheel and an airbag module, the connecting apparatus comprising:
   a coupling hole extending through the steering wheel in a front-rear direction of the steering wheel;
   a hook extending from the airbag module through the coupling hole and protruding from a rear surface of the steering wheel, the hook including a bend being provided on a distal end of the hook, the bend being bent in a direction intersecting a longitudinal direction of the hook;
   a fixing clip configured to block movement of the hook in a forward direction of the steering wheel, a first end of the fixing clip being fixed to the steering wheel, and a second end of the fixing clip being caught by the bend of the hook, wherein the second end of the fixing clip further includes a hook catch configured to correspond to a bent inner surface of the hook, and a middle portion of the fixing clip is wound such that the first end and the second end of the fixing clip are spread in opposite directions by elasticity; and
   a fixing recess indented into the steering wheel, the fixing recess allowing the second end of the fixing clip to move in the forward direction of the steering wheel,
   whereby the airbag module is mounted on a horn plate on a front portion of the steering wheel; and
   whereby the horn plate comprises a support rib extending in the longitudinal direction from the surface of the horn plate toward the bend of the hook and configured to be in contact with an outer surface of the hook.

2. The connecting apparatus of claim 1, wherein the middle portion of the fixing clip comprises a coiled torsion spring configured to increase the elasticity by which the first end and the second end of the fixing clip are spread.

3. The connecting apparatus of claim 1, wherein the fixing clip comprises the hook catch on the second end, the hook catch being wound on a wire of the second end of the fixing clip.

4. The connecting apparatus of claim 1, wherein the coupling hole is configured such that a cross-sectional area of the coupling hole gradually decreases in the longitudinal direction toward the hook.

5. The connecting apparatus of claim 1, wherein the fixing recess is provided in the horn plate and the fixing clip is coupled to the horn plate.

6. The connecting apparatus of claim 5, wherein the fixing recess has a step-shaped portion that is indented at a position of a rear surface of the horn plate such that a portion of the second end of the fixing clip is inserted.

7. The connecting apparatus of claim 5, further comprising a clip holder provided integrally with the horn plate and located adjacent to the coupling hole, wherein the fixing clip is coupled to the clip holder.

8. The connecting apparatus of claim 7, wherein the fixing clip is bent in a direction intersecting a direction in which the first end of the fixing clip extends, and the clip holder has an insertion recess indented such that the first end of the fixing clip is inserted thereinto.

9. The connecting apparatus of claim 7, wherein the clip holder comprises a limit recess into which the second end of the fixing clip is inserted.

* * * * *